United States Patent [19]

Barnes

[11] Patent Number: 6,077,079

[45] Date of Patent: Jun. 20, 2000

[54] DUAL-TEACHING-AID GAME

[76] Inventor: Latrell Barnes, 2 Queen St., Worcester, Mass. 01609

[21] Appl. No.: 09/083,323

[22] Filed: May 22, 1998

[51] Int. Cl.[7] ........................... G09B 19/00; G09B 19/02; G09B 1/00; A63F 3/06

[52] U.S. Cl. .......................... 434/128; 434/188; 434/191; 434/209; 273/269

[58] Field of Search ..................................... 434/128, 129, 434/188, 191, 200, 209; 273/269, 271, 272

[56] References Cited

U.S. PATENT DOCUMENTS

| | | | |
|---|---|---|---|
| 3,224,114 | 12/1965 | Swanson | 434/209 |
| 3,456,364 | 7/1969 | Alexander | 434/209 |
| 4,188,734 | 2/1980 | Rich | 434/209 |
| 4,940,240 | 7/1990 | Braley | 273/260 |
| 4,979,749 | 12/1990 | Onanian | 273/282 |
| 5,029,871 | 7/1991 | Willson, Jr. et al. | 273/271 |
| 5,100,139 | 3/1992 | Di Bella | 273/138 |
| 5,171,018 | 12/1992 | Zhang | 273/260 |
| 5,318,447 | 1/1994 | Mooney | 434/128 |
| 5,377,992 | 1/1995 | Audet | 273/271 |
| 5,421,732 | 6/1995 | Taylor | 434/195 |
| 5,688,126 | 11/1997 | Merritt | 434/128 |

FOREIGN PATENT DOCUMENTS

| | | | |
|---|---|---|---|
| 1532360 | 7/1968 | France | 434/191 |
| 9816 | 4/1898 | United Kingdom | 434/209 |
| 1426 | 12/1954 | United Kingdom | 434/191 |
| 2197521 | 5/1988 | United Kingdom | 434/191 |

*Primary Examiner*—Robert A. Hafer
*Assistant Examiner*—M. Priddy
*Attorney, Agent, or Firm*—Blodgett & Blodgett, P.C.

[57] ABSTRACT

An educational board game which is used with a conventional deck of playing cards. The game includes a board which has a matrix of spaces in vertical and horizontal rows. Some of the rows are guide rows containing suit and numerical value indicia relating to the playing cards. The remaining spaces contain numerical values having a mathematical relationship to corresponding spaces in the guide rows. Each of the remaining spaces is covered by a removable tile that bears the numerical value of the space and one of the suits of the playing cards.

12 Claims, 1 Drawing Sheet

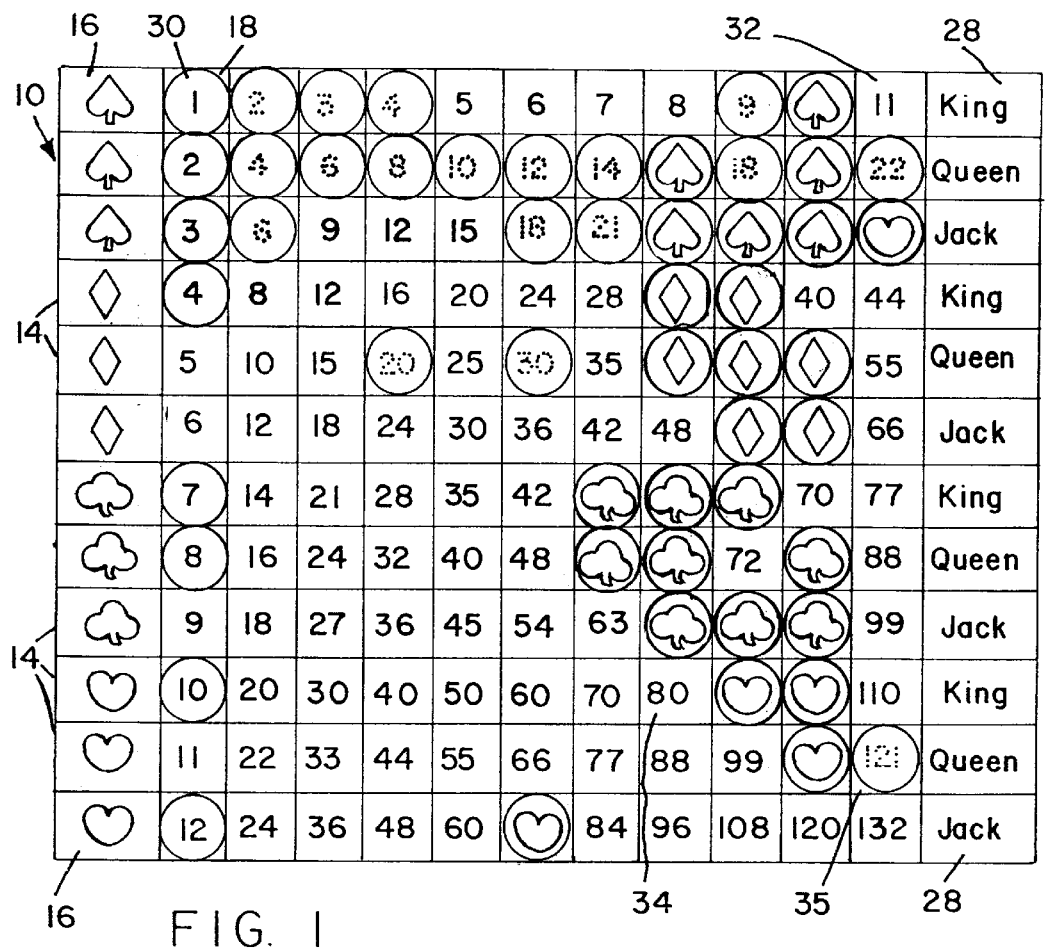
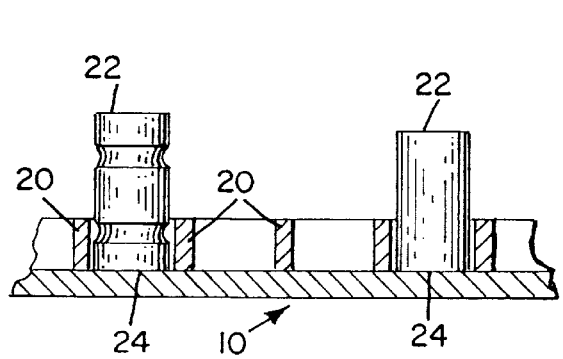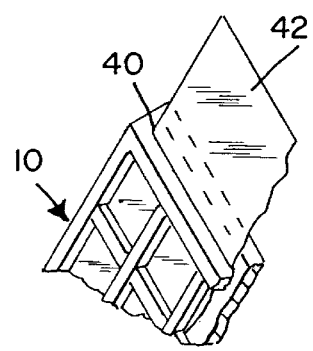
FIG. 1
FIG. 2
FIG. 3

DUAL-TEACHING-AID GAME

CROSS-REFERENCE TO RELATED APPLICATIONS

Not applicable

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

There have been many board games and many card games suggested and marketed. It is the object of the present invention to apply the principles of both to the present game in such a way as to provide a mathematical teaching aid as well as a game. This game is suitable for relatively young children as well as adults and helps the pupil especially in multiplication; while, at the same time, provides a very enjoyable game to play so that the teaching portion of the invention is quite painless.

BRIEF SUMMARY OF THE INVENTION

The game comprises a regular deck of cards, or other cards, a game board divided into squares in rows, and a set of chips, tiles, or "men", which have thereon values corresponding to similar values appearing on each of the squares on the board. An exception is that at the left hand edge of the board there is a vertical row or series of 12 squares, 3 of which bear the notation of 3 of clubs, 3 of diamonds, 3 of hearts, and 3 of spades, and these are aligned with a guide row of numerals starting at the top with the numeral 1 and ascending by units as the row goes down to the number 12. It will be seen that there is, therefore, a permanent series of three insignia of each of the four suits corresponding to the numerical guide row of numerals.

Aligned with the numerical guide row of numerals are the other squares in rows and the relationship between the values on the board and the cards is, generally speaking, the product of the value of a card being played, times the number of the guide row it is opposite. Thus, according to the suit and value, multiplied by the number of the square, equals the value of the tile. That is, if a card being played is the three of diamonds, one of the rows of diamonds is selected with its corresponding numeral, which would be either 4, 5, or 6. The value of the card is then multiplied by the number of the row so that the three of diamonds would indicate the third square to the right from the guide row, and this would have the value 9.

The tiles are used to obscure the values in the rows so that the player cannot see what they are and thus, if he multiplies wrong, or if he picks the wrong tiles, he loses his turn; but if he is correct, he picks up the tile and it is his. The player acquiring the most tiles wins the game, but there can also be another winner when the tiles are all taken from the board and each player totals the values of his tiles so that not only multiplication, but also addition, is a requisite in determining the winner and the ranks of the other players when the game is over.

When the word "tile" is used, it can also mean a chip, a "man", or any other removable piece which may be used to obscure the numbers appearing in the squares. In addition, it will be seen that it is quite possible to have the board set up with an electronic feature in which there are no tiles, but each of the values in the rows is blank, being lit up only when a correct corresponding button is pushed. The game can, of course, be played in the same manner it taking only the skill of an electrician to set up such an apparatus upon the revelation to such electrician of the present game.

The tiles, or chips, may be of any shape and when "squares" are referred to, of course such squares can be of any shape desired. One practical aspect of the game board is to provide rims in square shapes about each one of the squares so that the tiles, or chips may be placed therein and will not be accidentally moved out of the "square" during play.

BRIEF DESCRIPTION OF THE DRAWINGS

The character of the invention, however, may be best understood by reference to one of its structural forms, as illustrated by the accompanying drawings, in which:

FIG. 1 is a plan view of the board with most of the squares exposed because the chips, or tiles have been removed.

FIG. 2 is a cross-section through a portion of the board showing two possible shapes for the chips or tiles; and FIG. 3 is a perspective view illustrating the replaceable indicia sheet.

DETAILED DESCRIPTION OF THE INVENTION

A board generally indicated at 10 is divided into 12 horizontal squares 12 and in twelve horizontal rows 14. From the left, the first vertical row 16 of squares has shown thereon the indicia of the suits of a regular deck of cards, but of course this indicia could be anything else that might be suitable for the game. The deck of cards could be animals or cars, or any other kind of indicia that might be desired, and the number of rows of squares can also be varied. This application uses regular cards as they are known to almost everyone and illustrate the game well.

The next vertical row simply has the numerals 1 to 12 thereon, and the vertical row 18, is provided with tiles bearing visible numerals according to the sequence 1 to 12. This series can be called face chips, or tiles. The tiles are shown as circular and it is preferred that they are positioned in rims 20, see FIG. 2, so that they will not be moved sideways accidentally during play.

The next ten vertical rows have permanent numerals shown thereon which are in a certain sequence with relation to the vertical guide row of numerals 18. The first numeral in the guide row 18 is 1 and the horizontal sequence is 1 to 11. The second numeral in the guide row is 2 and the horizontal sequence is 2 to 22, and so on down through the entire guide row of numerals ending up with the largest number on the board at the lower right hand value 132 in the bottom row.

There is a tile, or chip for each one of the squares and these tiles or chips have on the top as at 22 in FIG. 2, the insignia of one of the indicia as shown in column 16—in the case shown, spades, diamonds, clubs and hearts. On the lower end 24 in FIG. 2 is the numeral corresponding to the numeral in the row 12; thus, there is only one tile or chip that can be placed in any one square, e.g., in the third column from the left, in the top row, is the tile with a spade at its upper end and impressed with the number 2 on the bottom 24. There is a tile for each square and the game cannot start until all the squares are filled. As shown in FIG. 1, certain of the tiles have been removed and certain of them, although not removed, have been shown with their numbers in dotted lines to better show the relationships and ratios involved.

The last column to the right on the board in FIG. 1, and indicated at 28, shows other cards not accounted for or so far described, these being the face cards, King, Queen and Jack, and these are played somewhat differently from the other tiles or chips.

The game board of FIG. 1 is designed to be used with up to three decks of conventional playing cards.

Each player is dealt five cards. It is perfectly possible to play the five cards, but it is also possible for the player to discard as many of the cards he holds as he wants to and to take other cards either from a pile, as in the case of Rummy, or to be dealt out an equivalent number of cards by the dealer, as in draw poker.

In any case, when all the players are satisfied that they have the best hand they can get, they proceed and play begins by the one who has the best hand starting. Supposing that this hand has four aces and a wild card—that is the equivalent of five aces. Aces may equal one or eleven at the players' choice. Starting with the ace of spades, he takes either the first tile or chip in a spade row, or if he wishes, the tile at eleven, as at square 32. This gives him one tile and the corresponding score. He then repeats, i.e., as to the ace of diamonds, ace of clubs, or ace of hearts. In the hearts, he gets twenty numbers and another tile. Once these tiles are off the board, they cannot be played again.

The player with the next best hand plays his cards, does the same thing and follows along and lifts his tiles in like manner, and when all the cards have been played, the hands are dealt again, and the game goes on until all the tiles are off the board.

At this point, the winner is the one who has the most tiles and an alternate winner is the one who has the greatest score. It is quite clear from the example shown in the present drawing that the biggest scores will come from the hearts. When the game has been played several times, the players will become skillful at filling out their poker hand as well as at multiplication and addition.

As to the mathematical aid part of the invention, a player, for instance with the eight of hearts, has to multiply 8 and 10, e.g. in the guide column, which equals 80. When the chip is in its space 34, the number 80 is obscured, but the player must multiply correctly and announce the results. If he should be wrong, he does not get the tile and he loses his turn. The player having the ace of hearts goes to the 11 numeral in the guide column 18 and he has to multiply 11×11 before he picks up the tile which is in the square 35 which shows the number 121. This tile hides the number 121 and the player must say 121, lift up the correct tile to expose the number 121, permanently imparted to the board, and then take the chip. But if he multiplies incorrectly, he cannot take the chip and loses his turn.

The crux of the game is that the player must multiply by 1, 2, and 3, if he has spades—whatever the value of his card is, such as the six of spades—he should pick up the tile in the correct square, but if the six of spades has already been taken, he can then go to cross row spade 2 and pick up the 12 tile.

The numbers in the squares other than the guide rows are products of the numbers of the vertical and horizontal guide rows. These squares could also contain numbers in accordance with other mathematical relationships, i.e. addition of the two corresponding numbers in the horizontal and vertical guide rows.

It has been found that just about all children are intrigued by cards and card games whether from the point of view of imitating their elders, or aggressiveness, or simply wanting to play a game to try to beat their companions. Even pupils who do not want to study or pay attention in class and are recalcitrant in general, nevertheless, are intrigued by card games and seem to be always willing to learn a new one. That is one of the reasons the present game is successful at teaching poor students without great effort.

In addition to the above description, it is pointed out that subtraction may be taught by using a guide row across the board, picking a number, and subtracting the number above the number picked. The answer will turn out to be in the top guide row and it can also be done by using the numbers down the board. Division may be accomplished by picking a number in the guide row and matching with another number in the same row. The answer will turn out to be in the top guide row directly above the number being divided into. It can also be done by starting off by picking a number in the top guide row to match with a number in the same row, etc.

Square roots may be accomplished by picking a number in the guide row, determining what the square of that number is, and choosing the correct square from the board in the same row. The least common denominator or two fractions may be done by using the cards in one's hand to make fractions. The player chooses the lowest common denominator from the board. In five card poker the extra card in the hand may be used as a whole number for any of the other fractions, or the player can use it to make another fraction with another one of the numbers.

Even spelling may be accomplished by making a word in a row and removing certain letters from that word and putting them in another row. In order to get the letters back to the word, you would have to multiply two correct numbers in the row with the words in it. Once the player has done that, he may then place the chips that are removed back in the row where they belong, thus completing the spelling of the word. This assumes letters on the same side of the chip as the numbers are in previous descriptions herein.

A sentence may be made by arranging the sentence by the chips and having the player multiply the correct numbers in order to turn the chips over to reveal the word or letters underneath. With words and puzzles, the players may put words in order to collect them for points or to make some kind of a crossword puzzle of words.

As shown in FIG. 3, the board 10 may be provided with an edge slot 40 throughout, and a "sandwich" type of board is provided, so that a numbers sheet 42 can be replaced by a sheet with letters, or indicia of any kind, thereby greatly expanding the games that can be played, especially with special cards that suit the indicia used. Various subjects can be used, the particular subject being shown on its separate replaceable sheet. For high school students, there may, in addition, be sheets with puzzles, brain twisters, famous quotes, foreign languages, etc.

What is claimed is:

1. A game comprising cards with varying indicia thereon:
   (a) a deck of conventional playing cards having suits and each suit containing cards with numerals in ascending order from 1 through 10;
   (b) a game board, having a plurality of spaces in vertical and horizontal rows, a vertical row showing the suits, a vertical guide row showing numerical values in ascending order from 1 up, and a plurality of vertical and horizontal rows of spaces showing values in amounts uniformly increasing, both vertically and horizontally, said spaces showing the values which are the products of selected cards' values times the number of a space in the vertical row showing the numerical value in the suit of the selected card; and (c) a set of tiles for covering the spaces so that the values of the spaces are obscured, said tiles being removable to reveal the amounts on the spaces.

2. The game of claim 1 wherein the values in each space to be revealed are the product of the card at hand times the number of guide row selected.

3. The game of claim 1 including a final vertical row of spaces showing the face cards of each suit.

4. The game of claim 1 including a top and outer row each showing numerals from 1 up.

5. The game of claim 4 wherein the numeral one is in the topmost space and the numerals descend in increasing value.

6. The game of claim 1 wherein the vertical row of spaces showing suits are twelve in number, there being three squares for each of four suits.

7. The game of claim 1 wherein the game board is slotted and the indicia appears on a separable and replaceable sheet.

8. A game to be played with a conventional deck of cards comprising a board and tiles:

(a) the board including a row of evenly spaced indicia corresponding to the suits in the deck, a row of evenly spaced numerals increasing in value, said rows being parallel and substantially coinciding with the indicia;

(b) a series of rows of numerals coincident with the first two rows, the last named numerals each equaling the value of a card being played, times the first named numeral coincident with the particular suit of said card being played; and (c) removable tiles for obscuring the said last named numerals so that said last named numerals are revealed upon removal of said tiles.

9. The game of claim 8 including upstanding rims on the board of each tile.

10. The game of claim 8 wherein the board is slotted substantially throughout and the indicia appears on a separable and replaceable sheet in the slot.

11. A game comprising:

(a) a deck of conventional playing cards having suits and each suit containing cards showing numerical values 1 through 10;

(b) a game board having a matrix of spaces in vertical and horizontal rows, one of said rows having a plurality of spaces showing the symbol for each of said suits, one of said vertical rows being a vertical guide row having spaces showing reference numerical values, one of said horizontal rows being a horizontal guide row having spaces showing numerical values in ascending order from 1 up which correspond to the numerical values of the playing cards, each of the remaining spaces of said matrix bearing a numerical value which has a specific mathematical relationship to the numerical values in the corresponding spaces of said horizontal and vertical guide rows; and (c) a plurality of removable tiles covering said spaces, each of said tiles for each of said remaining spaces of said matrix having a bottom surface bearing the number of the corresponding space and a top surface showing the symbol for one of said suits, the symbol for each of said suits being shown on a plurality of said tiles, the numerical value of each of said remaining spaces being exposed upon removal of a corresponding tile.

12. The game of claim 11, wherein the board has a slot which is parallel to said matrix of spaces and said spaces are windows, said game further comprising a plurality of sheets for insertion into said slot, each of said sheet showing numerical values corresponding to said spaces, the numerical values for each of said sheets differing from the numerical values of the others of said sheets.

\* \* \* \* \*